United States Patent
Jeon et al.

(10) Patent No.: US 9,648,541 B2
(45) Date of Patent: May 9, 2017

(54) APPARATUS AND METHOD FOR FORWARDING DATA BASED ON SOFTWARE DEFINED NETWORK IN COMMUNICATION NETWORK

(71) Applicant: Samsung Electronics Co., Ltd., Gyeonggi-do (KR)

(72) Inventors: Young-Ki Jeon, Gyeonggi-do (KR); Seong-Ryong Kang, Gyeonggi-do (KR); Woo-Jae Kim, Gyeonggi-do (KR); Jong-Hyune Kim, Seoul (KR); Jung-Ah Choi, Seoul (KR)

(73) Assignee: SAMSUNG-ELECTRONICS CO., LTD, Suwon-si, Gyeonggi-Do (KR)

(*) Notice: Subject to any disclaimer, the term of this patent is extended or adjusted under 35 U.S.C. 154(b) by 18 days.

(21) Appl. No.: 14/279,227

(22) Filed: May 15, 2014

(65) Prior Publication Data

US 2014/0341113 A1     Nov. 20, 2014

(30) Foreign Application Priority Data

May 15, 2013   (KR) .......................... 10-2013-0055016

(51) Int. Cl.
*H04W 40/02*     (2009.01)
*H04L 12/715*    (2013.01)

(52) U.S. Cl.
CPC ............. *H04W 40/02* (2013.01); *H04L 45/64* (2013.01)

(58) Field of Classification Search
None
See application file for complete search history.

(56) References Cited

U.S. PATENT DOCUMENTS 7,664,032 B2    2/2010   Nakamura et al.
8,605,734 B2 *  12/2013  Ichino ................... H04L 45/38
                                                      370/351

(Continued)

FOREIGN PATENT DOCUMENTS

WO     WO 2012/090351 A1    7/2012

OTHER PUBLICATIONS

International Search Report dated Aug. 25, 2014 in connection with International Patent Application No. PCT/KR2014/004348; 3 pages.

(Continued)

*Primary Examiner* — Hassan Kizou
*Assistant Examiner* — Hashim Bhatti

(57) ABSTRACT

To forward traffic to a base station using Software Defined Network technology, a method for operating a switch includes receiving path information of a packet to be forwarded from a source terminal to a plurality of destination terminals, from a controller, receiving the packet to be forwarded from the source terminal to the destination terminals, from a base station, and transmitting the packet along a path determined by the path information. An apparatus for controlling a switch in a communication network includes a transceiver configured to receive information of a source terminal and a plurality of destination terminals, from a server which controls a service for forwarding traffic from the source terminal to the destination terminals, and a controller configured to determine a packet forward path between the source terminal and the destination terminals, wherein the transceiver transmits the determined path information to at least one switch.

18 Claims, 6 Drawing Sheets

(56) References Cited

U.S. PATENT DOCUMENTS

| | | | |
|---|---|---|---|
| 9,038,151 B1* | 5/2015 | Chua | H04L 45/02 709/223 |
| 2003/0174725 A1* | 9/2003 | Shankar | H04L 12/4645 370/428 |
| 2005/0099983 A1* | 5/2005 | Nakamura | H04L 45/20 370/338 |
| 2009/0147784 A1* | 6/2009 | Miyazawa | H04L 12/4633 370/390 |
| 2011/0141890 A1* | 6/2011 | Giaretta | H04W 28/20 370/232 |
| 2011/0261723 A1* | 10/2011 | Yamato | H04L 45/34 370/255 |
| 2011/0261825 A1* | 10/2011 | Ichino | H04L 45/38 370/400 |
| 2012/0113989 A1* | 5/2012 | Akiyoshi | H04L 45/02 370/392 |
| 2012/0300615 A1* | 11/2012 | Kempf | H04W 24/02 370/216 |
| 2013/0028091 A1* | 1/2013 | Sun | G06F 9/5083 370/236 |
| 2013/0064243 A1* | 3/2013 | Akiyoshi | H04L 45/38 370/389 |
| 2013/0148667 A1* | 6/2013 | Hama | H04L 12/4633 370/400 |
| 2013/0242879 A1* | 9/2013 | Yamato | H04L 45/00 370/328 |
| 2013/0266017 A1* | 10/2013 | Akiyoshi | H04L 47/18 370/392 |
| 2013/0272310 A1* | 10/2013 | Suzuki | H04L 45/04 370/392 |
| 2013/0304915 A1* | 11/2013 | Kawai | H04L 43/026 709/224 |
| 2013/0329601 A1* | 12/2013 | Yin | H04L 45/02 370/254 |
| 2014/0254373 A1* | 9/2014 | Varma | H04W 40/36 370/235 |
| 2015/0023176 A1* | 1/2015 | Korja | H04L 45/42 370/236 |

OTHER PUBLICATIONS

Written Opinion of International Searching Authority Aug. 25, 2014 in connection with international Patent Application No. PCT/KR2014/004348; 5 pages.

* cited by examiner

APPARATUS AND METHOD FOR FORWARDING DATA BASED ON SOFTWARE DEFINED NETWORK IN COMMUNICATION NETWORK

CROSS-REFERENCE TO RELATED APPLICATION AND CLAIM OF PRIORITY

The present application is related to and claims the benefit under 35 U.S.C. §119(a) to a Korean patent application No. 10-2013-0055016 filed in the Korean Intellectual Property Office on May 15, 2013, the entire disclosure of which is hereby incorporated by reference.

TECHNICAL FIELD

The present disclosure relates generally to data forwarding in a communication network. More particularly, the present disclosure relates to an apparatus and a method for forwarding traffic to a particular base station using Software Defined Network (SDN) technology.

BACKGROUND

A Software Defined Network (SDN) separates a control plane and a data plane and centers the control plane on a single controller so that the data plane manages simple traffic forwarding and the central controller determines where and how the traffic is transmitted to. In particular, by means of various Application Program Interfaces (APIs) provided via a northbound API and programming using them, the controller can perform various traffic controls based on network information. An OpenFlow protocol supports the SDN. According to the OpenFlow, the forwarding information is forwarded between the controller and a switch, and switch status or traffic information is forwarded to the controller.

The OpenFlow protocol for the SDN technology is being standardized and defines only a method for forwarding the traffic. Accordingly, it is not clear that the OpenFlow can gain any benefit by itself. Currently, the OpenFlow protocol is applied mostly to the switch which interconnects servers in a data center, and how to apply the OpenFlow to recent communication networks such as Long Term Evolution (LTE) network is not fully discussed. Hence, a method for properly applying the SDN is required.

SUMMARY

To address the above-discussed deficiencies, it is a primary aspect of the present disclosure to provide an apparatus and a method for efficiently transmitting traffic of a Radio Access Network (RAN) in a communication network.

Another aspect of the present disclosure is to provide an apparatus and a method for efficiently transmitting traffic and improving service capability by applying service chaining in a communication network.

Yet another aspect of the present disclosure is to provide an apparatus and a method for transmitting traffic by applying a Software Defined Network (SDN) in a communication network.

Still another aspect of the present disclosure is to provide an apparatus and a method for building a traffic path by applying OpenFlow to a switch which connects base stations to a backhaul in a communication network.

According to one aspect of the present disclosure, a method for operating a switch in a communication network includes receiving path information of a packet to be forwarded from a source terminal to a plurality of destination terminals, from a controller; receiving the packet to be forwarded from the source terminal to the destination terminals, from a base station; and transmitting the packet along a path determined by the path information.

According to another aspect of the present disclosure, a method for operating a controller which controls a switch in a communication network includes receiving information of a source terminal and a plurality of destination terminals, from a server which controls a service for forwarding traffic from the source terminal to the destination terminals; determining a packet forward path between the source terminal and the destination terminals; and transmitting the determined path information to at least one switch.

According to yet another aspect of the present disclosure, an apparatus of a switch in a communication network includes a controller for receiving path information of a packet to be forwarded from a source terminal to a plurality of destination terminals, from an OpenFlow controller, receiving the packet to be forwarded from the source terminal to the destination terminals, from a base station, and controlling to forward the packet along a path determined by the path information.

According to still another aspect of the present disclosure, an apparatus of a controller for controlling a switch in a communication network includes a communication part for receiving information of a source terminal and a plurality of destination terminals, from a server which controls a service for forwarding traffic from the source terminal to the destination terminals; and a controller for determining a packet forward path between the source terminal and the destination terminals. The communication part transmits the determined path information to at least one switch.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
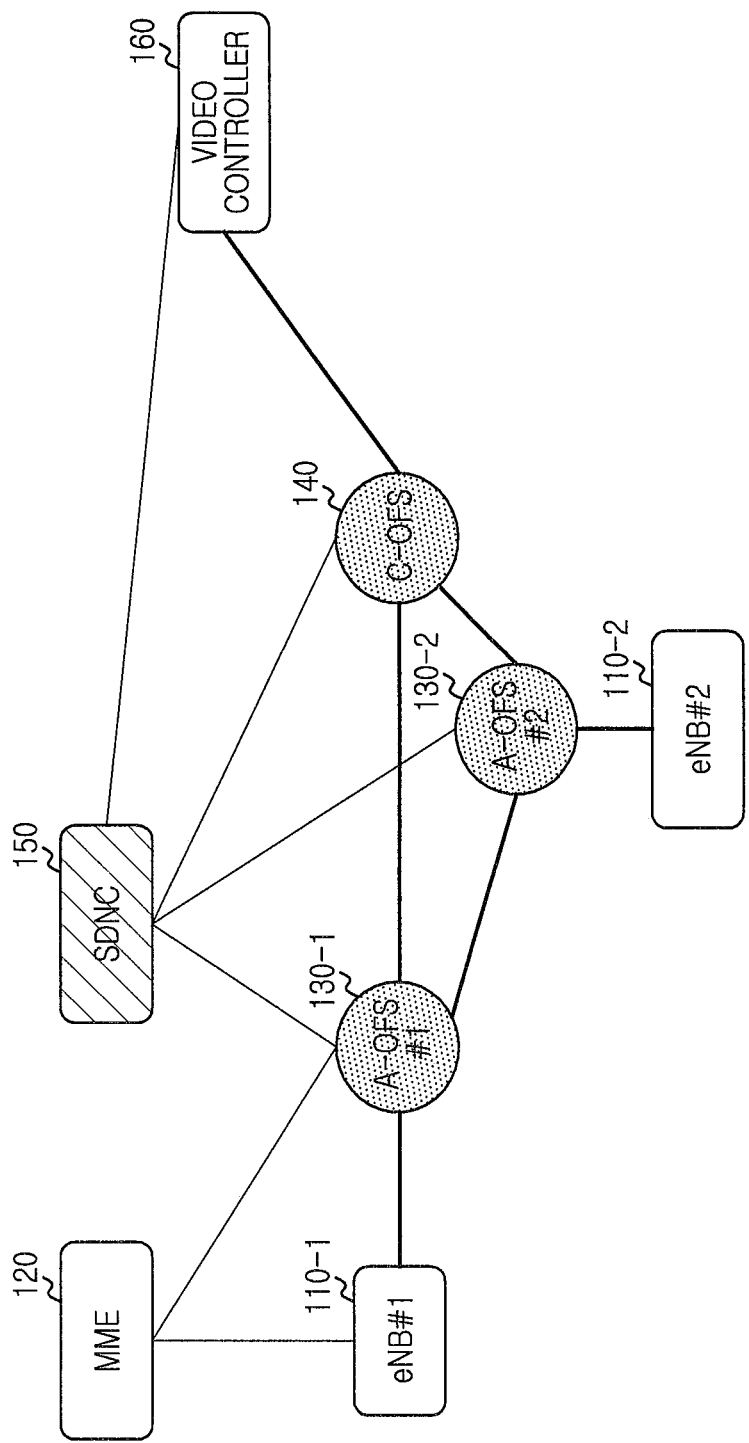
FIG. 1 illustrates a communication network according to an exemplary embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for forwarding traffic to a destination in a communication network. To ease the understanding, the present disclosure adopts terms and names defined in $3^{rd}$ Generation Partnership Project (3GPP) Long Term Evolution (LTE) standard. Yet, the present disclosure is not limited such terms and names and is equally applicable to other-standard systems.

A communication method according to an exemplary embodiment of the present disclosure includes an OpenFlow switch (hereafter, referred to as an Access OpenFlow Switch (A-OFS)) connected to a base station and an access cache, an OpenFlow switch (hereafter, referred to as a Core OpenFlow Switch (C-OFS)) interworking with a core network, and a Software Defined Network Controller (SDNC) for controlling the A-OFS and the C-OFS. The A-OFS and the C-OFS operate according to an OpenFlow protocol and accordingly set a path based on the SDNC and the OpenFlow. The SDNC analyzes traffic using Deep Packet Inspection (DPI), determines a forwarding path per switch, and transmits the forwarding path to each switch so that the packet is forwarded to an adequate server.

For efficient traffic transmission in the network, the A-OFS can serve as a General packet radio service Tunneling Protocol (GTP) endpoint. That is, the A-OFS can encapsulate and decapsulate a GTP packet. Hence, the A-OFS can function similar to a conventional Evolved Packet Core (EPC). As a result, a Mobility Management Entity (MME) of a legacy core network interworks with the A-OFS. The SDNC, which interworks with a video controller, obtains information and locations of a transmitting terminal and receiving terminals and then sets up the path of each switch. The overall structure is shown in FIG. 1.

FIG. 1 depicts a communication network according to an exemplary embodiment of the present disclosure.

Referring to FIG. 1, the communication network includes a base station 110, an MME 120, an A-OFS 130, an OFS 140, an SDNC 150, and a video controller 160.

The base station 110 provides radio access to terminals and supports connection between the terminals and the network. The base station 110 can be referred to as an evolved NodeB (eNB).

The MME 120 manages mobility of the terminals. That is, the MME 120 tracks and manages cells and location areas of the terminals.

The A-OFS 130, which is a switch for connecting base stations, sets up the path according to the OpenFlow protocol. More specifically, the A-OFS 130 sets up a bearer of the terminal, allocates resources, and processes the flow according to a Policy and Charging Control (PCC) rule. The A-OFS 130 manages a data plane of the EPC, and the path setup is controlled according to control information fed from the SDNC 150. The A-OFS 130 executes an OpenFlow agent. Accordingly, when an unset flow packet is received, the A-OFS 130 reports this to the SDNC 150 and sets up the path under control of the SDNC 150.

The C-OFS 140, which is a switch for processing the general OpenFlow protocol, obtains the forward path setup information from the SDNC 150 and builds the path based on the obtained information.

The SDNC 150 forwards a forward path setup command to the A-OFS 130 and the C-OFS 140 based on the OpenFlow protocol in association with the video controller 160. For doing so, the SDNC 150 can interwork with the video controller 160 using a RESTful API.

The video controller 160 provides the SDNC 150 with group member information obtained in initial 1:N video call set. The group member information can be forwarded using the RESTful API.

Figure 2:
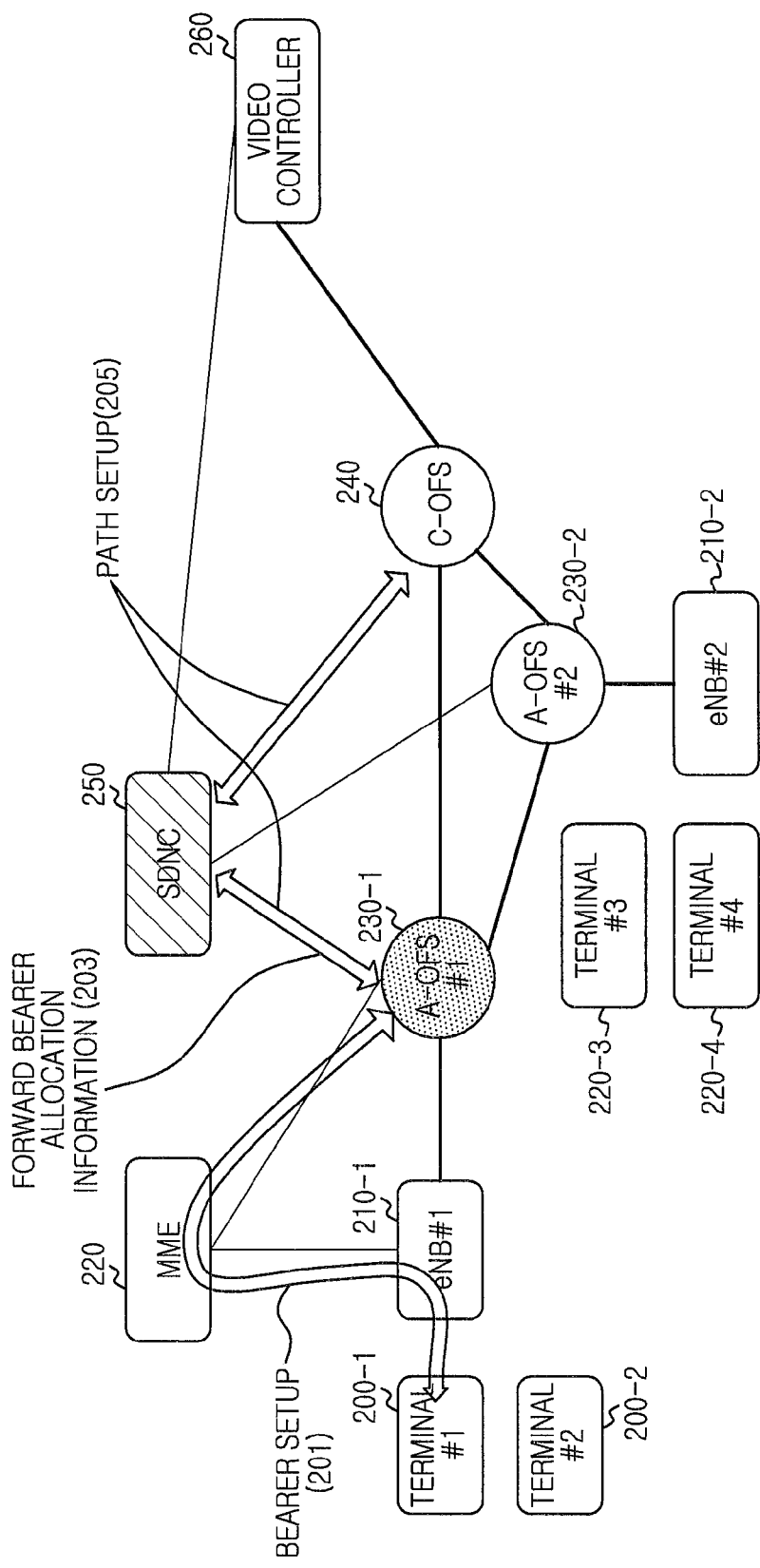
FIG. 2 illustrates Internet Protocol (IP) address allocation for terminal attachment in the communication network according to an exemplary embodiment of the present disclosure.

FIG. 2 depicts Internet Protocol (IP) address allocation for terminal attachments in the communication network according to an exemplary embodiment of the present disclosure.

Referring to FIG. 2, for initial access of a first terminal 200-1, the bearer setup is performed in step 201. For example, the bearer setup can conform to the LTE standard. Since an A-OFS 230 serves as the EPC, the A-OFS 230 performs the bearer setup and obtains and allocates an IP address of the first terminal 200-1 via an MME 220.

In step 203, the A-OFS 230 forwards bearer allocation information to the SDNC together with the allocated IP address of the first terminal 200-1. For example, the bearer allocation information can include Tunneling Endpoint IDentifier (TEID) and International Mobile Subscriber Identity (IMSI).

To route the traffic of the first terminal 200-1, the SDNC 250 sets the path of the OpenFlow switches including the OFS based on the IP address and the bearer allocation information in step 205. The SDNC 250 provides the set path to the A-OFS 230 and the C-OFS 240.

The bearer setup and the IP address allocation can be performed to a second terminal 200-2, a third terminal 200-3, and a fourth terminal 200-4 in the similar manner.

Now, the path setup and the traffic forwarding are explained based on a 1:N video call. The 1:N video call is a service for forwarding video traffic transmitted from one source terminal to a plurality of destination terminals. However, the present disclosure is not limited to the video call service, but is equally applied to any service for forwarding the traffic from one source terminal to the destination terminals. For example, the present disclosure can be applied to a Push To Talk (PTT) service.

When the switch does not conform to the OpenFlow protocol, in the 1:N video call setup, the source terminal which knows group information of the destination terminals to receive the video traffic transmits a request for transmitting the video traffic to each terminal. Hence, the video controller sets the bearer for each destination terminal and provides media relay server information for relaying the video traffic of the source terminal.

According to an exemplary embodiment of the present disclosure, the SDNC intervenes in the video call setup. The video call is set up as shown in FIG. 3.

Figure 3:
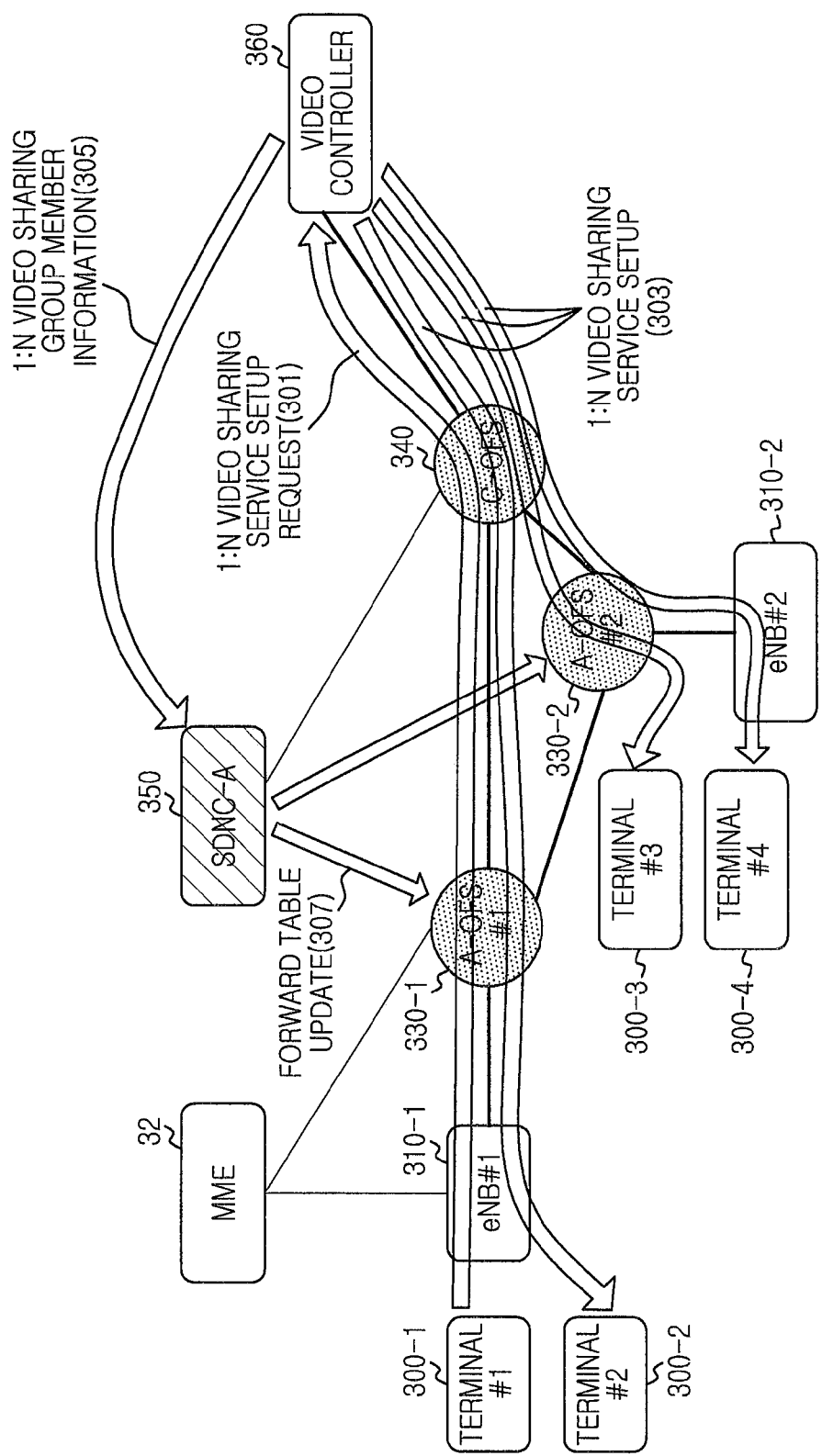
FIG. 3 illustrates video call setup in the communication network according to an exemplary embodiment of the present disclosure.

FIG. 3 depicts the video call setup in the communication network according to an exemplary embodiment of the present disclosure.

Referring to FIG. 3, a first terminal 300-1 requests the video call setup in step 301. At this time, the video call, which is the 1:N video sharing service, is destined for a second terminal 300-2, a third terminal 300-3, and a fourth terminal 300-4.

Hence, a video controller 360 sets the path to each terminal based on the group information in step 303. That is, the video controller 360 determines to forward the video traffic transmitted from the first terminal 300-1 to the second terminal 300-2, the third terminal 300-3, and the fourth terminal 300-4.

In step 305, the video controller 360 forwards information of the video call terminals to the SDNC 350. For example, the terminal information, i.e., the group information can be forwarded via the RESTful API. The video call group information includes source/destination IP address information of the first terminal 300-1, the second terminal 300-2, the third terminal 300-3, and the fourth terminal 300-4.

To forward the video traffic from the first terminal 300-1 to the second terminal 300-2, the third terminal 300-3, and the fourth terminal 300-4, the SDNC 350 forwards packet mirroring and forward commands to the A-OFSs 330 based on the source and destination node addresses in step 307. Based on the forwarded information, the A-OFSs 330 can obtain where to transmit the packet of the corresponding flow.

By contrast, when the switch does not conform to the OpenFlow protocol, in the 1:N video call, the video traffic from the source terminal is forwarded to the media relay server in the core network. Next, the media relay server unicasts the video traffic to each destination terminal using the path set by the video controller in the video call setup phase. That is, since the redundant video traffic is forwarded to the terminal over the communication network, the backhaul is subject to the load and the same traffic is transferred multiple times, to thus waste resources.

In this respect, the present disclosure provides a method for forwarding the video traffic without using the media relay server. The present video traffic forwarding is explained by referring to FIG. 4.

Figure 4:
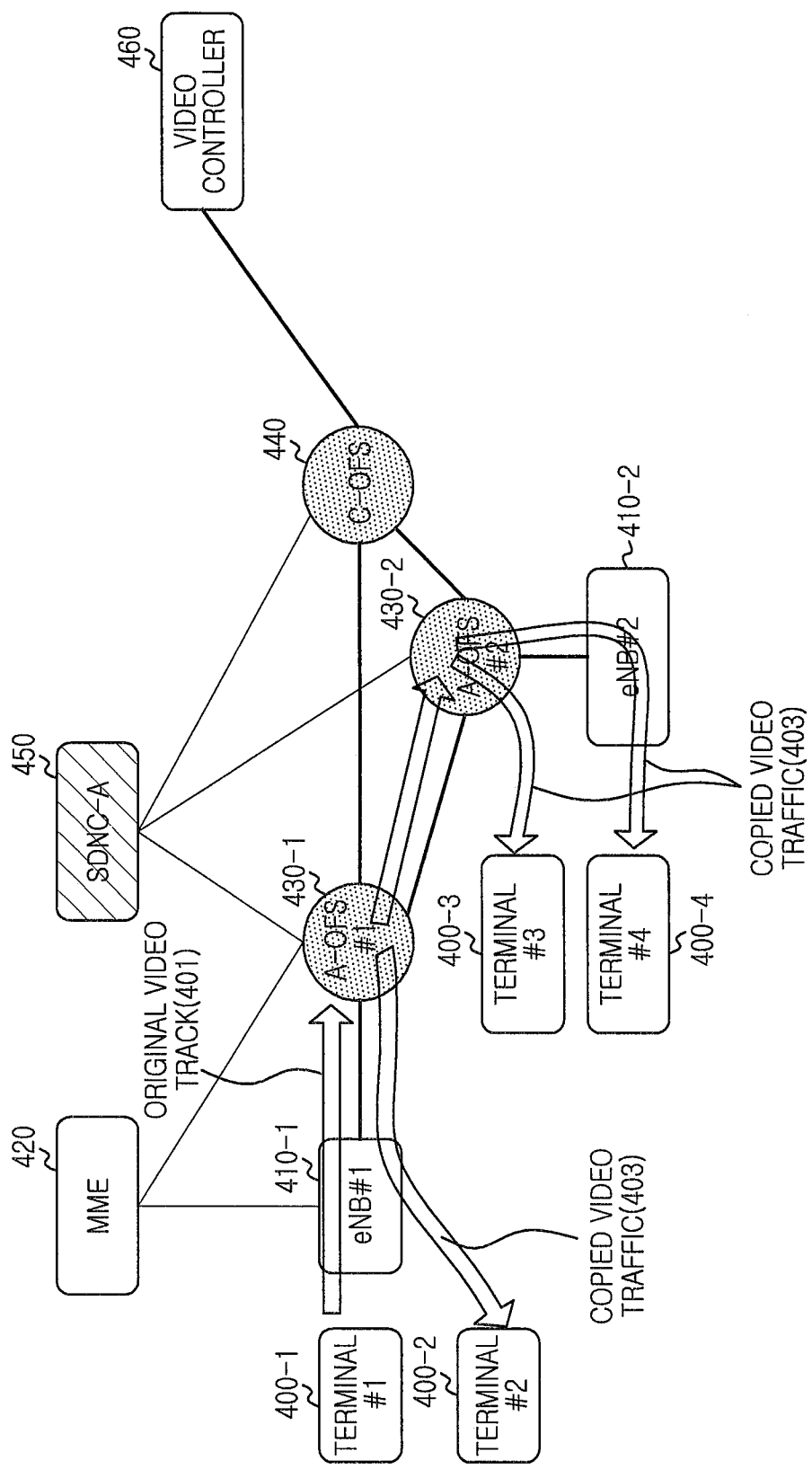
FIG. 4 illustrates video data forwarding in the communication network according to an exemplary embodiment of the present disclosure.

FIG. 4 depicts the video data forwarding in the communication network according to an exemplary embodiment of the present disclosure. In FIG. 4, the video traffic transmitted from a first terminal 400-1 is forwarded to a second terminal 400-2, a third terminal 400-3, and a fourth terminal 400-4 according to the mirroring and forward policy set by the SDNC 450.

Referring to FIG. 4, a video packet transmitted from the first terminal 400-1 is forwarded to an A-OFS#1 430-1 connected to a first base station 410-1 in step 401. The video packet is original video traffic.

According to the information received from the SDNC 450 in the video call setup, the A-OFS#1 30-1 knows that the received video packet is to be forwarded to the second terminal 400-2 and to the A-OFS#2 430-2 connected to a second base station 410-2 in order to forward the packet to the third terminal 400-3 and the fourth terminal 400-4. Hence, the A-OFS#1 430-1 copies the packet transmitted from the first terminal 400-1 and forwards the copied packet to the second terminal 400-2 and the A-OFS#2 430-2 connected to a second base station 410-2 in step 403. In so doing, when the packet is transmitted through the tunneling, the A-OFS#1 430-1 can decapsulate the tunneling packet and encapsulate the copied packet. More specifically, the A-OFS#1 430-1 can decapsulate and extract data, identify the destination terminals in the data, copy the data, and generate the tunneling packet by encapsulating the copied data. For example, the tunneling packet can be the GTP packet.

Based on the information received from the SDNC 450 in the video call setup phase, the A-OFS#2 430-2 connected to the second base station 410-2 knows that the received information is to be forwarded to the third terminal 400-3 and the fourth terminal 400-4. Hence, the A-OFS#2 430-2 connected to the second base station 410-2 copies and forwards the packet to the third terminal 400-3 and the fourth terminal 400-4 in step 403. At this time, when the packet is transmitted through the tunneling, the A-OFS#2 430-2 can decapsulate the tunneling packet and encapsulate the copied packet. For example, the tunneling packet can include the GTP packet.

As above, the 1:N video traffic can be forwarded using the minimum path and the minimum network resource. Namely, the video traffic can be forwarded without the aid of the relay server in the core network.

Figure 5:
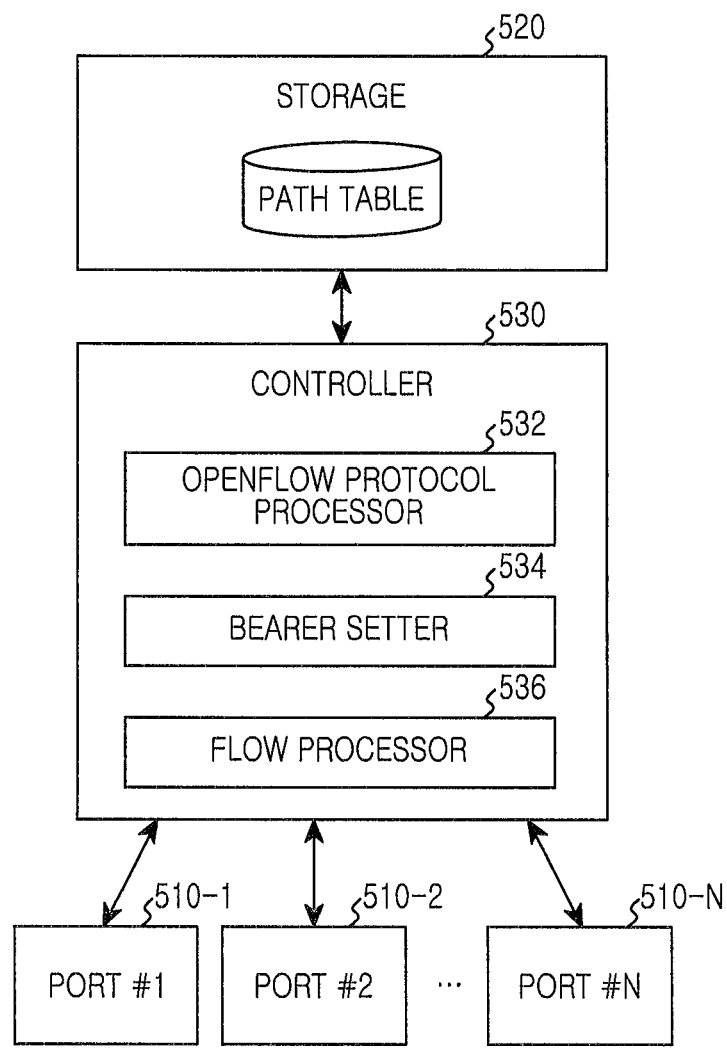
FIG. 5 illustrates an OpenFlow switch in the communication network according to an exemplary embodiment of the present disclosure.

FIG. 5 is a block diagram of the OpenFlow switch in the communication network according to an exemplary embodiment of the present disclosure.

Referring to FIG. 5, the OpenFlow switch includes a plurality of ports 510-1 through 510-N, a storage 520, and a controller 530.

The ports 510-1 through 510-N are connection points of lines for the backhaul network. The ports 510-1 through 510-N each can be connected to one base station.

The storage 520 stores a basic program for the operations of the OpenFlow switch, and setup information. In particular, the storage 520 stores the path information determined based on information notified from the SDNC. The storage 520 updates data and provides the stored data under control of the controller 530.

The controller 530 controls the OpenFlow switch operations. Specifically, the controller 530 controls an OpenFlow protocol processor 532 for controlling to serve as the OpenFlow protocol agent, a bearer setter 534 for setting the bearer of the terminal, and a flow processor 536 for processing the flow of the terminals. For the path setup and the traffic forwarding, the controller 530 controls the OpenFlow switch to act as the A-OFS of FIGS. 2, 3, and 4.

Figure 6:
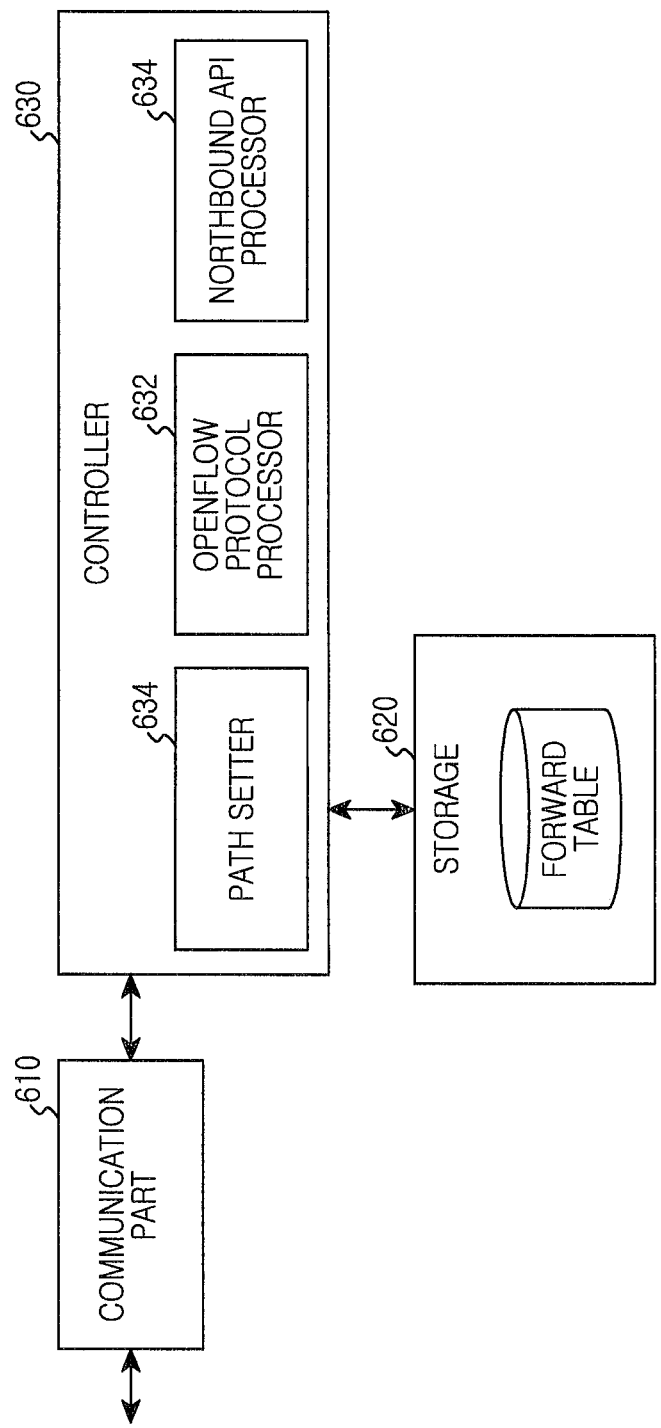
FIG. 6 illustrates a Software Defined Network Controller (SDNC) in the communication network according to an embodiment of the present disclosure.

FIG. 6 is a block diagram of the SDNC in the communication network according to an exemplary embodiment of the present disclosure.

Referring to FIG. 6, the SDNC includes a communication part 610, a storage 620, and a controller 630.

The communication part 610 (e.g., transceiver) provides an interface for transmitting and receiving information to and from other entity over the network. The communication part 610 can be referred to as a network card, an Ethernet card, an Ethernet adaptor, or a Network Interface Card (NIC). The communication part 610 transmits and receives signals as stated above. Hence, the communication part 610 can be referred to as a transmitter, a receiver, or a transceiver.

The storage 620 stores a basic program for the operations of the SDNC, an application program, and data such as setup information. In particular, the storage 620 stores a forward table including the path information of the OpenFlow agents. The storage 620 updates the data and provides the stored data under control of the controller 630.

The controller 630 controls the operations of the network entity. For example, the controller 630 transmits and receives signals via the communication part 610. The controller 630 includes an OpenFlow protocol processor 632 for controlling to serve as the controller according to the OpenFlow protocol, a path setter 634 for setting the path of the OpenFlow agents, and a northbound API processor 636 for receiving information for the path setup. The controller 630 can obtain the information for the path setup via the northbound API processor 636 by interworking with the video controller.

For the path setup and the traffic forwarding, the controller 630 controls the SDNC to serve as the SDNC of FIGS. 2, 3, and 4.

As set forth above, the redundant transmission of the same traffic unicast to each receiving terminal in the conventional 1:N traffic transmission is avoided, and User eXperience (UX) of the receiving terminal is enhanced by transmitting the traffic along the optimal path. In particular, since the media relay server essential for the conventional 1:N traffic transmission is not needed any more, capital expenditures (CAPEX) reduce.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating a switch in a communication network, comprising:
   establishing a bearer between a source terminal accessed to a base station and the switch connected to the base station based on an internet protocol (IP) address of the source terminal received from a mobility management entity (MME);
   transmitting, to a controller, information of the bearer;
   receiving path information for a packet to be forwarded from the source terminal to a plurality of destination terminals, from the controller;
   receiving the packet to be forwarded from the source terminal to the plurality of destination terminals, from a base station thorough the bearer; and
   transmitting the packet along a path determined by the path information to at least one switch that receives the packet, and forwards the packet both to a base station serving at least one of the plurality of destination terminals and to at least one other remaining destination terminal,
   wherein the path information is determined, by the controller, based on IP addresses of the source terminal and the plurality of destination terminals and bearer information regarding bearers established for the source terminal and the plurality of destination terminals.

2. The method of claim 1, wherein the packet is a tunneling packet,
further comprising:
decapsulating the tunneling packet;
identifying the plurality of destination terminals; and
generating a tunneling packet by encapsulating the packet.

3. The method of claim 1, wherein the transmitting of the packet comprises:
transmitting the packet to at least one other switch coupled to at least one base station coupled to the plurality of destination terminals.

4. The method of claim 1, wherein the transmitting of the packet comprises:
transmitting the packet to the base station.

5. The method of claim 1, further comprising:
if receiving a flow packet with an unset path, notifying to the controller.

6. A method for operating a controller which controls a switch in a communication network, comprising:
receiving, from at least one switch, bearer information regarding bearers established for a plurality of terminals accessed to the at least one switch, wherein the bearers are established based on internet protocol (IP) addresses of the plurality of terminals that are transmitted from a mobility management entity (MME) to the at least one switch;
receiving information for a packet to be forwarded from a source terminal to a plurality of destination terminals, from a server which controls a service for forwarding traffic from the source terminal to the destination terminals;
determining a packet forward path between the source terminal and the plurality of destination terminals based on IP addresses of the source terminal and the plurality of destination terminals and bearer information regarding bearers established for the source terminal and the plurality of destination terminals; and
transmitting information of the packet forward path to the at least one switch that receives the packet, and repeatedly forwards the packet to a plurality of base stations, each base station serving at least one of the plurality of destination terminals.

7. The method of claim 6, wherein the information of the source terminal and the plurality of destination terminals is received via a RESTful Application Program Interface (API).

8. The method of claim 6, wherein the determining of the packet forward path between the source terminal and the plurality of destination terminals comprises:
determining to forward the packet from a switch coupled to a base station of the source terminal to a switch coupled to a base station of one of the destination terminals.

9. The method of claim 6, further comprising:
for an initial access of the source terminal, receiving bearer setup information of the source terminal from a switch coupled to a base station of the source terminal.

10. An apparatus of a switch for supporting an OpenFlow protocol in a communication network, comprising:
a controller for:
establishing a bearer between a source terminal accessed to a base station and the switch connected to the base station based on an internet protocol (IP) address of the source terminal received from a mobility management entity (MME);
transmitting, to an OpenFlow controller, information of the bearer;
receiving path information for a packet to be forwarded from the source terminal to a plurality of destination terminals, from the OpenFlow controller,
receiving the packet to be forwarded from the source terminal to the plurality of destination terminals, from a base station through the bearer, and
controlling to forward the packet along a path determined by the path information to at least one switch that receives the packet, and forward the packet both to a base station serving at least one of the plurality of destination terminals and to at least one other remaining destination terminal,
wherein the path information is determined, by the controller, based on IP addresses of the source terminal and the destination terminals and bearer information regarding bearers established for the source terminal and the plurality of destination terminals.

11. The apparatus of claim 10, wherein the packet is a tunneling packet, and
the controller is further configured to decapsulate the tunneling packet, identify the plurality of destination terminals, and generate a tunneling packet by encapsulating the packet.

12. The apparatus of claim 10, wherein the controller forwards the packet to at least one other switch coupled to at least one base station coupled to one of the plurality of destination terminals.

13. The apparatus of claim 10, wherein the controller is configured to forward the packet to the base station.

14. The apparatus of claim 10, wherein, when receiving a flow packet with an unset path, the controller is configured to notify to the OpenFlow controller.

15. An apparatus of a controller for controlling a switch in a communication network, comprising:
a communication part configured to receive, from at least one switch, bearer information regarding bearers established for a plurality of terminals accessed to the at least one switch, wherein the bearers are established based on internet protocol (IP) addresses of the plurality of terminals that are transmitted from a mobility management entity (MME) to the at least one switch, and receive information for a packet to be forwarded from a source terminal to a plurality of destination terminals, from a server which controls a service for forwarding traffic from the source terminal to the plurality of destination terminals; and
a controller configured to determine a packet forward path between the source terminal and the destination terminals based on IP addresses of the source terminal and the plurality of destination terminals and bearer information regarding bearers established for the source terminal and the plurality of destination terminals,
wherein the communication part is further configured to transmit information of the determined path to the at least one switch that receives the packet, and forwards the packet both to a base station serving at least one of the plurality of destination terminals and to at least one other remaining destination terminal.

16. The apparatus of claim 15, wherein the information of the source terminal and the plurality of destination terminals is received via a RESTful Application Program Interface (API).

17. The apparatus of claim 15, wherein the controller is configured to determine to forward the packet from a switch coupled to a base station of the source terminal to a switch coupled to a base station of one of the plurality of destination terminal.

18. The apparatus of claim 15, wherein, for an initial access of the source terminal, the communication part is configured to receive bearer setup information of the source terminal from a switch coupled to a base station of the source terminal.

* * * * *